United States Patent [19]

Tschritter

[11] E Re. 31,418

[45] Reissued Oct. 18, 1983

[54] METERING APPARATUS FOR PLASTIC MATERIALS

[75] Inventor: Alfons Tschritter, Mittelbuchen near Hanau, Fed. Rep. of Germany

[73] Assignee: Colortronic Reinhard & Co., K.G., Friedrichsdorf, Fed. Rep. of Germany

[21] Appl. No.: 354,399

[22] Filed: Mar. 3, 1982

Related U.S. Patent Documents

Reissue of:

[64] Patent No.: 3,814,296
Issued: Jun. 4, 1974
Appl. No.: 328,097
Filed: Jan. 30, 1973

[30] Foreign Application Priority Data

Mar. 28, 1972 [DE] Fed. Rep. of Germany ..... 2214982

[51] Int. Cl.[3] ..... G01F 11/24

[52] U.S. Cl. ..... 222/220; 222/345; 418/169

[58] Field of Search ..... 418/171, 170, 169; 222/216, 217, 220, 345, 346

[56] References Cited

U.S. PATENT DOCUMENTS

| | | | |
|---|---|---|---|
| 792,620 | 6/1905 | Ryan . | |
| 1,664,802 | 4/1928 | Walker | 222/220 |
| 2,126,200 | 8/1938 | Linderman | 418/169 |
| 2,364,469 | 12/1944 | Orr | 418/169 |
| 2,619,292 | 11/1952 | Nichols et al. | 418/169 |
| 3,316,851 | 5/1967 | Hagenes | 418/169 |
| 3,563,417 | 2/1971 | Jordan | 222/189 |
| 3,592,572 | 7/1971 | Schnell | 418/169 |

OTHER PUBLICATIONS

*Kent's Mechanical Engineer's Handbook in Two Volumes*, Design and Production Volume, Twelfth Edition, pp. 13-08 - 13-10.

*Standard Handbook for Mechanical Engineers*, Seventh Edition, pp. 14-14 - 14-17.

*Primary Examiner*—H. Grant Skaggs

*Attorney, Agent, or Firm*—Bernard, Rothwell & Brown

[57] ABSTRACT

A metering device for plastic materials comprising a bin having a rotating feed disc at the bottom thereof. The feed disc has peripheral cogs which partially define a metering chamber. Facing the metering disc is an ejection disc having teeth meshing with the cogs for forcing material into the metering chamber and ejecting the material from the metering chamber through an opening in the side of the bin.

8 Claims, 3 Drawing Figures

METERING APPARATUS FOR PLASTIC MATERIALS

Matter enclosed in heavy brackets [ ] appears in the original patent but forms no part of this reissue specification; matter printed in italics indicates the additions made by reissue.

Metering devices for plastic materials are known to the art. However, the known devices are complicated in structure and, therefore, costly to manufacture. It is an advantage of this invention to improve and simplify these devices and also to increase the reliability of the performance of these devices and to reduce their manufacturing costs.

These advantages are achieved according to this invention by having a rotatable feed disc disposed on the bottom of a supply bin for holding the plastic material to be metered. The feed disc is provided with cogs that project into the plastic or kneadable material. A metering chamber is provided generally between the cogs. A rotatable ejection disc faces the feed disc and has teeth which reach between the cogs and force the mass out a discharge opening in the side of the bin.

The feed disc together with the ejection disc which is disposed in the supply bin assure accurate metering of a kneadable mass. The mass to be metered rests on the rotating feed disc and the ejection disc and is pushed into the metering chamber by both discs thus preventing bridging within the material and its accompanying failures in metering. The individual parts used are simple in construction and easily manufactured and this assures great reliability in performance and a long service life. As the result of the small number of structural elements and their simple design, the costs of manufacturing, maintaining and cleaning can be kept down.

It is a further development of this invention that the metering chamber may be provided with a cover plate extending into the supply bin such that the ejection disc is disposed between the cover plate and the feed disc. The cover plate thus at least partially closes off the metering chamber. The ejection disc rests upon the feed disc and the teeth on the ejection disc mesh with the cogs to advance the mass into the metering chamber and to push the mass out through the discharge opening. The cogs preferably extend up to the cover plate and their height is preferably the same as that of the teeth on the ejection disc. At the entry side of the metering space the cover plate may be sloped or beveled to facilitate the introduction of material into the metering chamber. The cover plate may also be provided with an opening or slot for discharging the excess mass which has been driven out by the cogs from the spaces between the teeth of the ejection disc. An opening or slot may be formed in the wall of the supply bin and/or the cover plate to prevent excessive compaction of the kneadable mass in the metering chamber.

Preferably, according to this invention, a triangular wiper is fixed to the cover plate to prevent the mass between the cogs from being pushed back and to close off the metering chamber between the cogs and the cover plate. The triangular wiper may have two curved sides, one adjacent to the outer cicumference of the teeth of the ejection disc and the other adjacent the inner circumference of the cogs on the feed disc. The metering device can be cleaned quickly and simply by having the cover plate removably set into the supply bin by means of pins, projections, clamping edges or the like. A comminuting grate may be disposed at the discharge opening for dividing the metered material.

Other features and advantages of the invention will become apparent from the following detailed description made with reference to the drawings. The drawings show an exemplary embodiment in schematic form.

Figure 1:
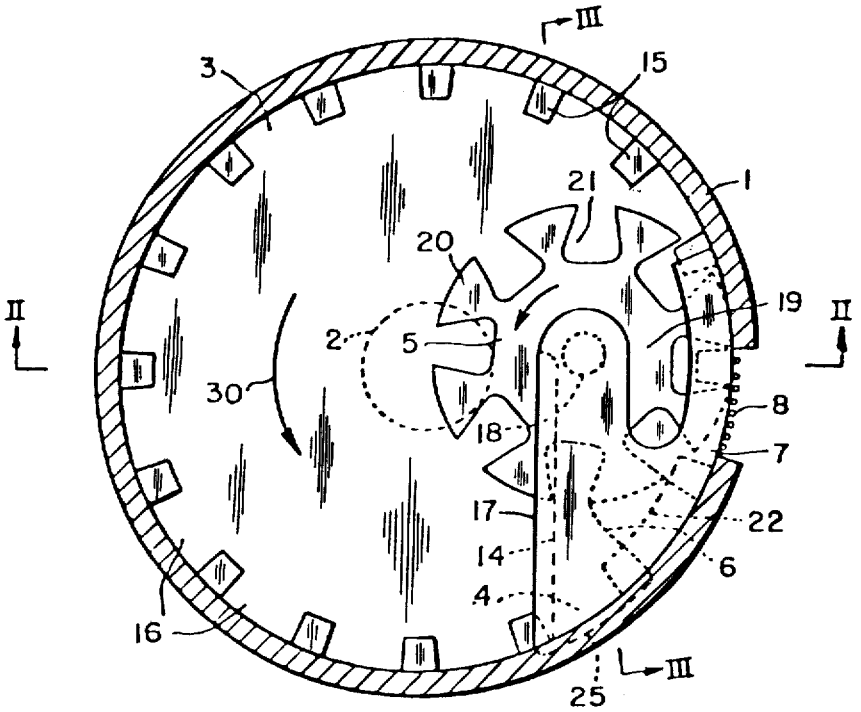
FIG. 1 is a plan view of the metering device in the supply bin.
Figure 2:
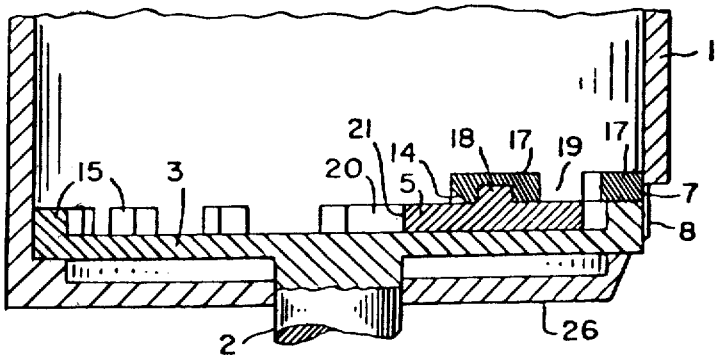
FIG. 2 is a section taken along line II—II of the arrangement of FIG. 1.
Figure 3:
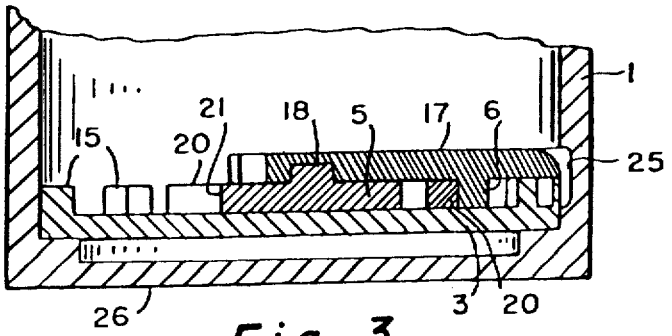
FIG. 3 is a section taken along line III—III of FIG. 1.

The embodiment according to this invention shown in FIGS. 1 to 3 comprises a metering device disposed on the floor of a supply bin 1 and consists of a rotatable disc 3 driven by a shaft 2, a metering chamber 4, an ejection disc 5, a triangularly shaped wiper 6 and a discharge opening 7 with a comminuting grate 8. Disposed on the periphery of disc 3 are cogs 15 between which are spaces 16. The material to be metered is fed into spaces 16 and pressed into metering chamber 4 which is defined partially by a plate 17 projecting into supply bin 1. On its forward side plate 17 has a sloped portion 14 in order to facilitate the pushing-in or feeding of the mass into metering chamber 4. plate 17 contains a pin 18 for rotatably positioning disc 5 which rests on rotating disc 3. Ejection disc 5 is provided with teeth 20 which fit into the spaces 16 between adjacent cogs 15 of the feed disc and force the material which is to be metered out of discharge opening 7. The ejection disc may preferably be arranged with its outer cicumference tangent to the outer circumference of the feed disc at about the end of the discharge opening. The kneadable or plastic mass resting on disc 3 is conveyed into metering chamber 4 by rotating disc 3 as well as through spaces 21 between teeth 20 and the spaces 16 between cogs 15.

A slot 19 in cover plate 17 makes it possible for the mass which is displaced from spaces 21 by cogs 15 to escape upwardly. Triangular wiper 6 is provided in order to prevent the mass in spaces 16 from being pushed back into the metering chamber. This wiper is secured to plate 17 and closes off spaces 16. Wiper 6 with its edge 22 running parallel to the wall of the bin together with cover plate 17 serves to further define a chamber of an ever constant magnitude between cogs 15. In order to allow excess material to escape from metering chamber 4, a slot 25 is machined into plate 17 and/or into the wall of supply bin 1. Through this slot material may emerge upwardly into supply bin 1 whenever the compaction of material which might occur in metering chamber 4 requires.

The operational procedure of the device of the invention is as follows. Shaft 2 which passes through floor 26 of supply bin 1 and is driven by a motor (not shown) together with feed disc 3, is rotated in the direction indicated by arrow 30. Since cogs 15 and teeth 20 mesh with one another, ejection disc 5 is also rotated and by means of its teeth 20 together with cogs 15 advances the kneadable mass resting on disc 3 into metering chamber 4. The mass disposed in space 16 is separated from the rest of the mass by means of wiper 6 and is thereupon pushed out of supply bin 1 in a precisely metered volume through discharge opening 7 by teeth 20 of ejection disc 5 meshing with cams 15. Comminuting grate 8 prevents the formation of pellets.

The mass present in spaces 21 of ejection disc 5 escapes upwardly through slot 19 in cover plate 17. When teeth 20 leave space 16 and emerge from metering chamber 4, a new mass enters this space, thus assuring continuous metering and ejection of the mass. Excessive compaction of the mass in metering chamber 4 is avoided by allowing the excess mass to escape upwardly into supply bin 1, thus preventing interruptions in operation. The metering device may be readily disassembled so that it may be cleaned or repaired without significant time loss. The metering device may be adapted to the prevailing requirements of the masses to be metered by changing the shape of cogs 15 and teeth 20, In this way, it is also possible to accommodate the varying viscosity of the masses that are to be metered. By controlling the speed of the feeding disc, the metering rate can be controlled. For practical purposes, cover plate 17 is removably set into the supply bin so that the metering device may be readily disassembled and cleaned.

Having thus described my invention with the detail and with the particularity required by the Patent Laws, what is desired protected by Letters Patent is set forth in the following claims.

I claim:

[1. A metering device for kneadable masses and the like comprising a supply bin having a floor, a rotatable feed disc with cogs projecting into the bin disposed on said floor, a rotatable ejection disc having teeth engaging said cogs to form a metering chamber, said teeth being arranged to force the content of the metering chamber out a discharge opening in the bin, a cover plate covering the metering chamber and projecting into the supply bin, the cogs extending to the coverplate, their height being equal to the height of the teeth on the ejection disc whereby during the metering a closed metering chamber is formed.]

[2. A metering device according to claim 1 wherein the coverplate is sloped at the entry side to avoid overloading of the metering chamber.]

3. A metering device according to claim [2] *7* wherein the coverplate is provided with *the means for allowing escape in the form of* a slot for the release of the excess mass displaced by cogs from the spaces between the teeth of the ejection disc.

4. A metering device according to claim 3 wherein a release recess is formed in the wall of the supply bin to prevent excessive compaction of the kneadable mass in the metering chamber.

[5. A metering device according to claim 1 wherein the discharge opening has a comminuting grating disposed thereon for dividing the metered material.]

6. A metering device for kneadable masses and the like comprising a supply bin having a floor, a rotable feed disc with cogs projecting into the bin disposed on said floor, a rotable ejection disc having teeth engaging said [cog] *cogs* to form a metering chamber *between cogs*, said teeth being arranged to force the content of the metering chamber out a discharge opening in the bin, a coverplate covering the metering chamber and projecting into the supply bin, *the cover plate closing the top of the metering chamber adjacent the discharge opening*, a triangular wiper fixed to said coverplate having two curved sides, one adjacent the outer circumference of the ejection disc and the other adjacent the inner circumference of the cogs, the cogs [extend] *extending* to the coverplate and their height being equal to the height of the teeth on the ejection disc whereby during the metering *a* completely closed metering chamber is formed, *and means for allowing kneadable mass between the teeth to escape in a direction other than to the discharge opening during engagement of the teeth with the cogs.*

*7. A metering device for kneadable masses and the like comprising a supply bin having a floor, a rotatable feed disc with cogs projecting into the bin disposed on said floor, a rotatable ejection disc having teeth engaging said cogs to form a metering chamber between cogs, said teeth being arranged to force the content of the metering chamber out a discharge opening in the bin, a cover plate covering the metering chamber and projecting into the supply bin, the cover plate closing the top of the metering chamber adjacent the discharge opening, the cogs extending to the coverplate, their height being equal to the height of the teeth of the ejection disc whereby during the metering a closed metering chamber is formed, means for allowing kneadable mass between the teeth to escape in a direction other than to the discharge opening during engagement of the teeth with cogs, and wherein the coverplate is sloped at the entry side to avoid overloading of the metering chamber.*

*8. A metering device for precisely metering kneadable masses and the like, comprising: a supply bin having a floor and a discharge opening adjacent the floor in a side wall thereof, a rotatable feed disc with cogs projecting upwardly from a top face thereof into the bin, the feed disc disposed on the bin floor, a shaft attached to the feed disc for driving the same, a freely rotatable ejection disc having teeth engaging said cogs to form a series of movable metering chambers, between cogs, the bottom face of the ejection disc rotatable closely adjacent the top face of the feed disc, the ejection disc teeth being arranged to force the content of each successive metering chamber out the discharge opening in the bin, a cover plate covering each successive metering chamber and projecting into the supply bin, the coverplate closing the top of each successive metering chamber adjacent the discharge opening and also journalling the freely rotatable ejection disc for rotational drive from the feed disc, the cogs extending to the bottom of the coverplate, the height of the cogs being equal to the height of the teeth of the ejection disc whereby during metering a series of successive closed metering chambers are formed one at a time adjacent the discharge opening and the contents are discharged through the discharge opening in precisely metered amounts corresponding to the volume of the metering chamber, and means for allowing kneadable mass between the teeth to escape in a direction other than to the discharge opening during engagement of the teeth with the cogs.*

*9. A metering device according to claim 8 wherein the discharge opening has a comminuting grating disposed thereon for dividing the metered material forced through the discharge opening by teeth of the ejection disc.*

*10. A metering device according to claim 6 wherein the coverplate at the entry side thereof is beveled for facilitating entry of kneadable mass in the metering chamber.*

*11. A metering device according to claim 10 wherein a release recess is formed in the wall of the supply bin to prevent excessive compaction of the kneadable mass in the metering chamber.*

* * * * *